April 21, 1970     R. C. MARSHALL     3,507,099
CENTRIFUGAL LIQUID-VAPOR SEPARATOR
Filed Oct. 25, 1966     2 Sheets-Sheet 1
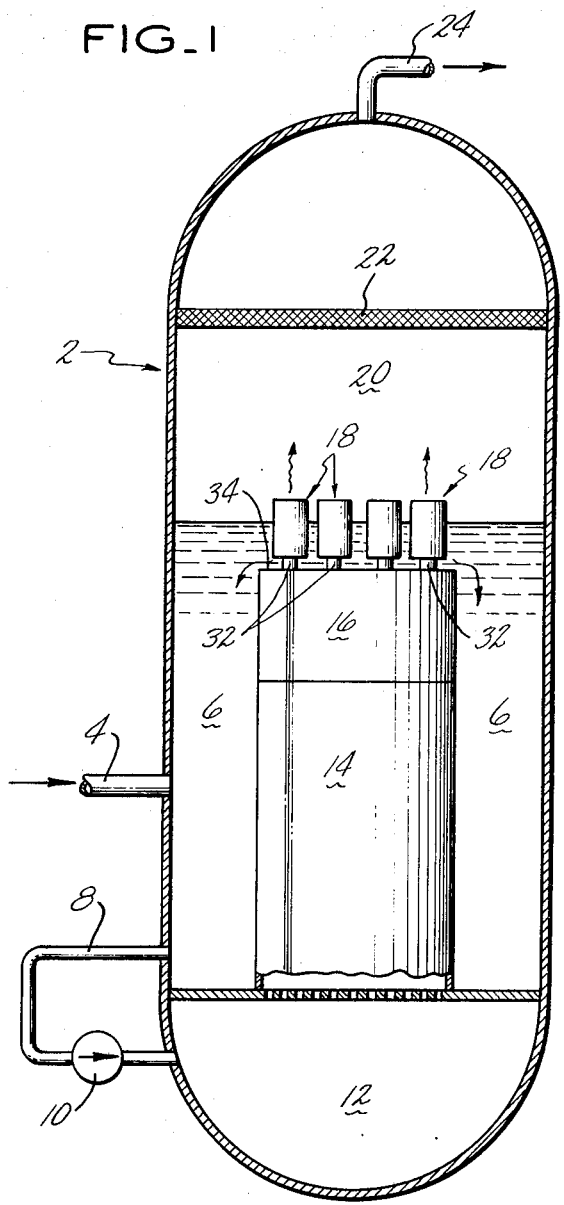
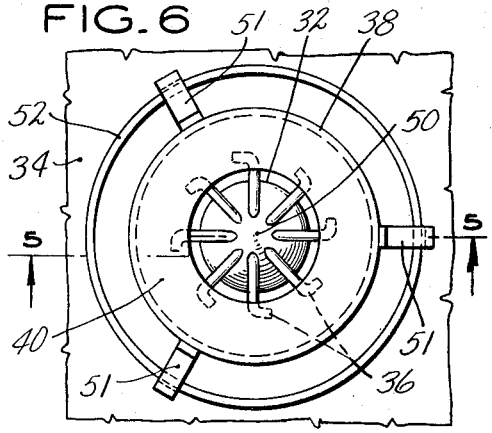
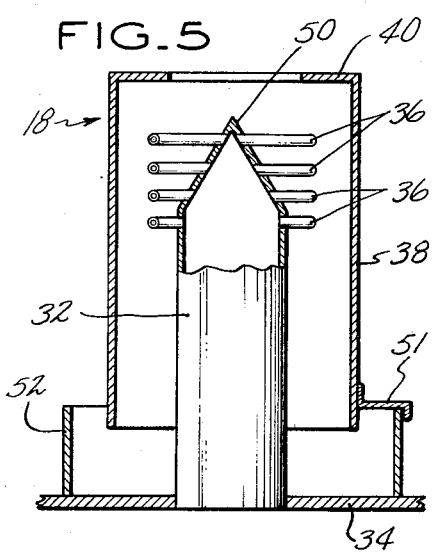
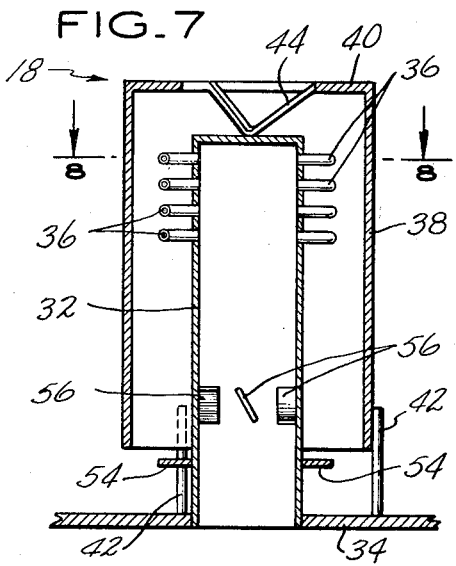
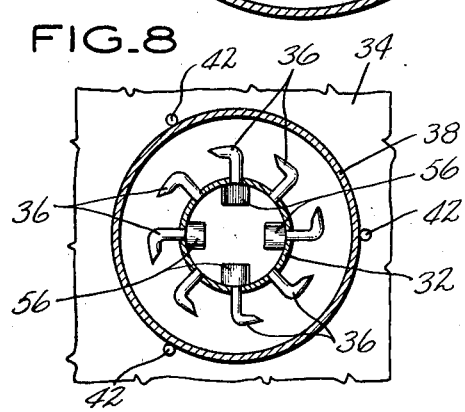

United States Patent Office 3,507,099
Patented Apr. 21, 1970

3,507,099
CENTRIFUGAL LIQUID-VAPOR SEPARATOR
Robert C. Marshall, West Avon, Conn., assignor to Combustion Engineering, Inc., Windsor, Conn., a corporation of Delaware
Continuation-in-part of application Ser. No. 316,846, Oct. 17, 1963. This application Oct. 25, 1966, Ser. No. 596,375
Int. Cl. B01d 45/12; F22b 37/26
U.S. Cl. 55—456                     3 Claims

ABSTRACT OF THE DISCLOSURE

A centrifugal separator for water-steam mixtures having a central vertical upflow pipe which is closed at the top, and a surrounding outer pipe open at both the top and bottom. A plurality a discrete round tubular elbows are located near the top of the central pipe at a plurality of elevations and arranged to discharge the water-steam mixture tangentially into the annular space. The elbows are vertically spaced a sufficient distance to permit the rotating steam to pass freely between the elbows. Distribution of the water-steam mixture to the elbows at various elevations may be improved by locating the elbows on a gradually reducing portion of the central pipe and by introducing a centrifugal action in the fluid flowing upwardly through the central pipe so that the water tends to favor the lower elbows.

---

This is a continuation-in-part of application Ser. No. 316,846 now abandoned filed Oct. 17, 1963. The invention relates to steam-water separators and in particular to separators of the centrifugal type.

The very nature of steam generators with their recirculation characteristics demands separation of the steam and water. A critical portion of this separation has always been the avoidance of material amounts of water carried over with the steam. Liquid thus carried over will subject turbines or other equipment to thermal and physical shock. The liquid which is carried over also has a higher solids content than the steam and therefore leads to considerable deposition of solids in superheater tubing and on turbine blading. This causes overheating of the superheater tubing materials and a decrease in turbine efficiency.

Carryunder, or the steam which is entrained in and carried down with the recirculating water tends to promote cavitation in the recirculating pump, and in boiling water reactors decreases the maximum power output of the core.

Since vapor generators are required to operate on demand over wide load range, it is important that minimum carryover and carryunder be maintained throughout a wide range of steam-water ratios. The limit of power production in a given vessel size steam generator is often based on the steam separation. It is therefore important that the separators be able to operate at maximum throughput capacities.

The ability to maintain good separation over wide ranges is encouraged by a unique combination of the basic features from the art which are applied in this design. The initial separation of water and steam is accomplished through centrifugal action so that a force many times gravity can be applied for this separation. A vortex is sustained so that a definite surface is maintained with a minimum of splashing and a reasonable residence time is maintained. The removal of the steam and water from the separator depends on gravity so that the water flows downward in the separator while the steam flows upward. Separators of the skimmer type where water is skimmed from the outside of a centrifugal separator must be designed for a particular steam-water ratio and some sacrifice in separating efficiency is encountered any time there is a deviation from this design ratio. Since in this type separator the removal of water and steam does not depend on gravity, but only on the skimming action, steam is skimmed at low loadings and water carries through on high loadings.

In my invention the mixture is directed approximately tangentially and therefore smoothly into the free vortex surface at high loadings when high velocities exist. At lower loadings the vortex surface is farther removed from the nozzles causing the mixture to impinge on the vortex surface at a more obtuse angle, tending to create more disturbance. However, lower jet velocity exists leaving the nozzle tending to offset this. The upward steam velocity within the separator is lower due to the decreased flow and increased flow area available at this time. There is therefore an increase in the ordinary gravity type separation which occurs within the separator. Separator efficiency at these low loadings is therefore maintained. A water discharge back pressure or seal is maintained so that the water vortex is maintained.

The feature in my invention of discrete nozzles discharging the mixture permits smooth flow of the separated steam out of the separator. The steam can pass through between the nozzles while maintaining its rotary motion, avoiding disturbances which would be set up if it were required to pass between vanes which would require a cessation of the rotation. Furthermore, the discharge nozzle is enclosed as it passes through the steam space avoiding any interaction between the incoming mixture and the discharging steam, thereby avoiding additional turbulence and splashing.

It is an object of this invention to provide a centrifugal separator which can be simply mounted in a steam generator.

It is a further object of this invention to provide a compact high capacity separator so that high steam release rates may be achieved.

It is a still further object of this invention to provide a separator capable of wide range operation with low carryunder and low carryover.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of illustrative embodiments, these embodiments being shown by the accompanying drawings wherein:

FIG. 1 shows an arrangement of a steam geneator employing the separators;

FIG. 5 shows a sectional side elevation of another embodiment of the present invention;

FIG. 6 shows a plan view of FIG. 5;

FIG. 7 shows a sectional side elevation of still another embodiment of the present invention; and FIG. 8 shows a sectional plan view of the embodiment of FIG. 7, taken through section line 8—8.

Figure 2:
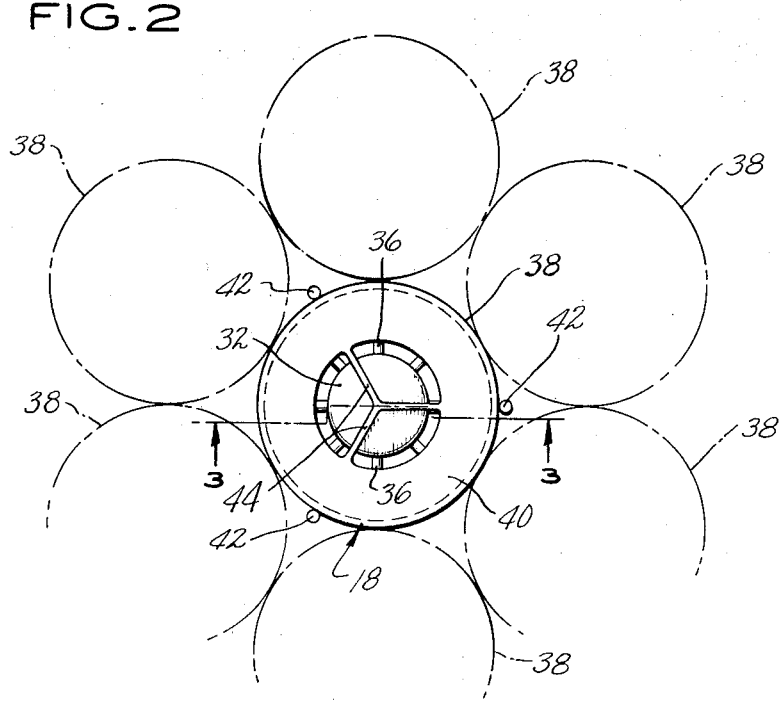
FIG. 2 shows a plan view of a group of separators, one of which is shown in detail.

FIG. 1 shows a boiling water reactor with pressure vessel 2 and feedwater line 4. Incoming feedwater through line 4 mixes with the recirculating water 6 passing through pump suction line 8 and circulating pump 10 into water volume 12. This water is partially evaporated in passing through heat source 14 into plenum chamber 16. The steam-water mixture with a high percentage of water passes through the separators 18 where the water is discharged as recirculating water 6 and the steam is released into steam space 20, thereafter passing through screen driers 22 and steam outlet pipe 24. This steam-water mixture varies from a zero steam quality at no load to 10% steam quality at full load.

Figure 3:
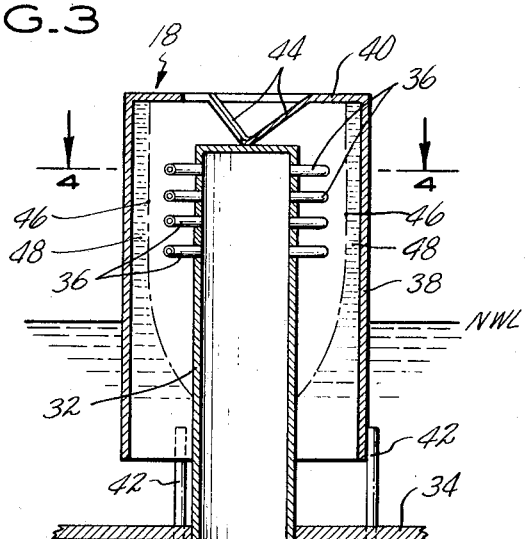
FIG. 3 shows a sectional side elevation taken through section line 3—3 of FIG. 2.
Figure 4:
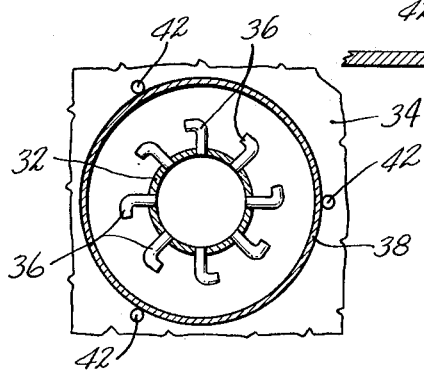
FIG. 4 shows a sectional plan view of the same embodiment taken through section line 4—4 of FIG. 3.

Referring now to FIGS. 2, 3 and 4, riser 32 is mounted on the tube sheet 34 which covers the plenum chamber of the steam generating section of the reactor. Nozzles 36 are welded to the upper end of the riser 32, these nozzles being in the form of approximately 90° elbows. Surrounding the riser 32 is vessel 38 with annular ring 40 secured internally to the upper end of the vessel. This vessel 38 is supported from the bottom with struts 42 which are welded to the vessel and to the tube sheet 34. The vessel 38 is supported at its upper end by struts 44 which are welded to the upper end of the riser 32 and to the annular ring 40.

This structure provides for center entrance of the mixture, with the water egress located outwardly. Since the source of the mixture is the generator plenum chamber located directly below the separators, the separators may be simply mounted on an extension of the riser pipes. A plurality of these separators are closely spaced within the pressure vessel.

In operation the steam-water mixture passes up through the riser 32 and out through the nozzles 36. The mixture is discharged from the end of these tubular outlets. This imparts a rotating motion to the mixture between the riser 32 and the vessel 38. The line of demarcation between water and steam as separated is shown by line 46. The annular space between the vessel 38 and the riser 32 has a uniform outlet at the lower end for water egress. The normal water level of the water in the surrounding pool is maintained intermediate the upper and lower ends of the vessel 38. Thus the hydrostatic pressure of the water outside the vessel maintains sufficient back pressure on the water leaving the vessel to insure that water is maintained inside the vessel to permit a vortex formation, and a definite water-steam interface in the separator. A generously sized water outlet together with the outside water level makes a wide range of satisfactorily operating through-flows possible while sustaining the vortex, since the mean level within the separator is a function not only of the hydrostatic backpressure, but also the friction drop through the outlet due to flow. Maintenance of the vortex keeps the water within the separator in the centrifugal field for sufficient time to permit maximum water-steam separation.

At low through-flows the thickness of the water ring 48 is small. The fluid leaving the nozzles 36 therefore impinges at an angle with the free surface of the water creating turbulence and interface disturbances. However since the separator is operating at a low rating, with low velocities, gravity separating efficiency is good. When the flow through the separator is increased, the thickness of the water ring 48 increases so that the line of demarcation 46 approaches the outlet of the nozzles 36. At this time the flow leaving the nozzles is approximately tangential with the flow of water whereby there is minimum disturbance of the interface surface. This therefore results in efficient operation at this critical time of maximum through-flow.

The steam within the separator is necessarily rotating in the same direction as the water. This steam as released must find its way upwards through the opening in the annular plate 40. The use of the discrete nozzles 36 permits this steam to flow in its upward path while still maintaining its rotary motion thereby avoiding increased turbulence and pressure drop. Since the nozzle 36 confines the mixture which is entering the separator, chance of entrainment of water in the portion of steam rising is minimized. The centerline of the nozzle outlets should be between the quarter points of the annulus (not closer to either vessel 38 or riser 32 than ¼ the distance between the riser and vessel), and preferably at about the center of the annulus, as illustrated. If the nozzles are too close to the vessel 38, they will interfere with the water ring 48 and cause splashing. If too close to the riser 32, there will be insufficient steam flow area when there is a thick water ring 48, and a steep impingement angle on the water surface 46 when there is a thin water ring causing splashing.

A multiplicity of small streams issuing from the nozzles, rather than a few large streams, permits the formation of a smoother vortex surface. It also decreases the distance that steam and water particles must travel laterally to effect separation.

Annular ring 40 serves to intercept the water ring 48 thereby avoiding spillover of the water over the top of the vessel 38. Were this ring not used, the vessel 38 would have to extend considerably higher until the natural parabolic vortex would run into the surface of the wall 38.

FIG. 5 shows an embodiment of the invention where the riser 32 is capped with a conical closure 50 at the upper end. The nozzles 36 are located in the conical section with one row of nozzles being located just below this section. In a deadend header of the type shown in the riser of FIG. 1 the static pressure increases as the fluid passes the exits, since the velocity decreases. Therefore the nozzles toward the deadend of the header are favored with higher flow. By reducing the flow section as fluid is removed, the velocity in the riser and therefore the velocity head tends to be maintained. Therefore there is less increase in static pressure as the fluid passes the majority of the nozzles, thereby improving the distribution of flow to the nozzles. The flow area for the steam leaving the separator is also increased, decreasing the velocity in this area, thereby maximizing gravity separation of any remaining water particles.

The outlet of the nozzles follows essentially a vertical line rather than the configuration of the riser pipe so that at peak capacity the effluent from the nozzles will be tangent with the water ring surface. In FIG. 5 the lower end of the vessel 38 is surrounded by a water seal ring 52 and supported by lugs 51. When used in a location as illustrated in FIG. 1, this permits a water seal to be maintained within the separator should the water level outside the water separator drop below the bottom of vessel 38, thereby preventing loss of the vortex. This structure maintains a water level in the water seal ring 52 independent of the existence of a level in the surrounding environment. This level operates to maintain the hydrostatic back pressure, so that the separator may be installed at any location.

FIGS. 7 and 8 illustrate another embodiment of the invention. This includes an annular ring 54 fastened to the riser near the bottom of the vessel 38. This ring acts to block the steam vortex thereby decreasing the possibility of steam being carried through the outlet of the vessel 38 due to entrainment in lateral flow at this zone.

Since the water is more dense than the steam, the velocity of the mixture through riser 32 would produce a higher water percentage at the upper nozzles than at the lower nozzles. After leaving the nozzles, the water must pass downwardly. Less interaction between the descending water and rising steam in the annular space is desired. Therefore internal vanes 56 impart rotation to the mixture passing through the riser encouraging the denser water to flow to the ouside, thereby favoring water flow to the first encountered or lower nozzles. This decreases the amount of interaction between the water and steam in the annular space between riser 32 and vessel 38.

FIG. 8 shows a modification of the nozzles 36 where the outlet portion of the nozzle is cut at approximately at 45° angle so that expansion of the jet can start occurring before impingement on the water ring 46. Due to the inertia of the water particles, the tendency will be for the steam to start expanding inwardly.

Air-water tests have been made in the laboratory using a riser with slots and vanes instead of elbows as in my invention. The throughput was limited by the choking effect when the water built up to the maximum thickness of the annular ring with impending extensive carryover. In comparing these results to the nozzle type separator in this same size vessel, it was noticed that the vortex thickness with the vanes was much greater than that with the elbows. The vortex tended to consume all the available annular space between the vanes and the vessel. Comparable maximum ratings where carryover became troublesome in an 18 inch enclosure are as follows: with the slots and vanes, air flow 3.8 c.f.s, water flow 3.6 c.f.s. and carryunder 0.325 c.f.s.; with the nozzle type separator, air flow 5.6 c.f.s., water flow 3.8 c.f.s. and carryunder 0.0 c.f.s.

What I claim is:

1. A centrifugal separator for steam-water mixtures comprising: a first vertical pipe closed at the upper end; a plurality of discrete vertically spaced tubular outlets located near the upper end of said first pipe with free space between the vertically spaced tubular outlets and in fluid flow communication with the interior of said first pipe, said outlets discharging so as to induce tangential motion in the steam-water mixture leaving the outlets; a second pipe co-axial with the first pipe and having a diameter greater than that of the first pipe, the second pipe being co-extensive with that portion of the first pipe having outlets thereon; the lower end of the annulus intermediate said first and second pipes being in fluid communication with a pool of water surrounding said second pipe, with the surface level of the pool being intermediate the upper and lower extremities of said second pipe; means located inside said first pipe for imparting a rotating motion to the fluid passing through below said tubular outlets.

2. An apparatus as in claim 1 wherein said means for imparting a rotating motion to the mixture comprises vanes inside said first pipe.

3. A centrifugal separator for steam-water mixtures comprising: a first vertical pipe closed at the upper end; a plurality of discrete vertically spaced tubular outlets located near the upper end of said first pipe with free space between the vertically spaced tubular outlets and in fluid flow communication with the interior of said first pipe, said outlets discharging so as to induce tangential motion in the steam-water mixture leaving the outlets; a second pipe co-axial with the first pipe and having a diameter greater than that of the first pipe, the second pipe being co-extensive with that portion of the first pipe having outlets thereon; the lower end of the annulus intermediate said first and second pipes being in fluid communication with a pool of water surrounding said second pipe, with the surface level of the pool being intermediate the upper and lower extremities of said second pipe; said first vertical pipe having a gradually reducing section at its upper end, with said tubular outlets at a plurality of elevations being located on the gradually reducing section.

References Cited

UNITED STATES PATENTS

| | | |
|---|---|---|
| 3,068,629 | 12/1962 | Jones. |
| 3,086,343 | 4/1963 | Stern. |
| 3,066,088 | 11/1962 | Blaser. |
| 3,251,176 | 5/1966 | Gleason _____ 55—355 |
| 3,296,779 | 1/1967 | Daman et al. _____ 55—337 |
| 171,951 | 1/1876 | Piper. |
| 331,785 | 12/1885 | Gogerty. |
| 677,357 | 7/1901 | Hyde _____ 55—455 |
| 696,601 | 4/1902 | Sims _____ 55—458 |
| 1,705,669 | 3/1929 | Kobernik _____ 55—184 |
| 1,767,324 | 6/1930 | Tasker _____ 261—124 X |
| 2,075,344 | 3/1937 | Hawley _____ 261—79.1 |
| 2,256,524 | 9/1941 | McKelvey _____ 55—184 |
| 2,418,381 | 4/1947 | Wegmann _____ 55—455 |
| 2,610,697 | 9/1952 | Lovelady et al. _____ 55—174 |
| 2,763,245 | 9/1956 | Place _____ 55—455 |

FOREIGN PATENTS

| | | |
|---|---|---|
| 612,849 | 1/1961 | Canada. |
| 901,290 | 7/1962 | Great Britain. |

FRANK W. LUTTER, Primary Examiner

BERNARD NOZICK, Assistant Examiner

U.S. Cl. X.R.

55—459; 122—488